United States Patent

Amalric et al.

(10) Patent No.: US 9,798,008 B2
(45) Date of Patent: Oct. 24, 2017

(54) METHOD OF GUIDANCE FOR PLACING A SATELLITE ON STATION

(71) Applicant: THALES, Courbevoie (FR)

(72) Inventors: Joël Amalric, Auribeau sur Siagne (FR); Thierry Dargent, Auribeau sur Siagne (FR); Christophe Le Bris, Mouans-Sartoux (FR)

(73) Assignee: THALES, Courbevoie (FR)

( * ) Notice: Subject to any disclaimer, the term of this patent is extended or adjusted under 35 U.S.C. 154(b) by 45 days.

(21) Appl. No.: 14/967,080

(22) Filed: Dec. 11, 2015

(65) Prior Publication Data

US 2016/0178750 A1    Jun. 23, 2016

(30) Foreign Application Priority Data

Dec. 17, 2014    (FR) .................. 14 02879

(51) Int. Cl.
   *G05D 1/00*    (2006.01)
   *G01S 19/02*    (2010.01)
   (Continued)

(52) U.S. Cl.
   CPC .............. *G01S 19/02* (2013.01); *B64G 1/007* (2013.01); *B64G 1/405* (2013.01)

(58) Field of Classification Search
   CPC ........... B60W 2550/402; B60W 40/06; B60W 10/06; G06F 19/00
   (Continued)

(56) References Cited

U.S. PATENT DOCUMENTS 5,779,195 A * 7/1998 Basuthakur ............ B64G 1/007
                                                    244/173.1
6,768,944 B2 * 7/2004 Breed ................... B60W 40/06
                                                    213/36
(Continued)

FOREIGN PATENT DOCUMENTS

FR         2 998 875 A1    6/2014

*Primary Examiner* — Gertrude Arthur Jeanglaude
(74) *Attorney, Agent, or Firm* — Baker & Hostetler LLP

(57) ABSTRACT

A method of guidance for placing a satellite on station comprises the following steps carried out during a predefined current cycle: A) determining on the ground a law of orientation of the thrust vector, and a history of state variables and of adjoint state variables of the satellite for the transfer from a starting orbit to a target orbit using optimal control theory, B) determining on the ground a law of evolution of the rotation of the satellite about the thrust vector, on the basis of the orientation law and of the history, C) representing according to a predetermined format the evolution of the state variables and adjoint state variables so as to obtain first parameters, D) representing according to a predetermined format a law of evolution of the rotation so as to obtain second parameters, E) concatenating the first and second parameters so as to obtain a guidance plan for the satellite, F) downloading onboard the guidance plan, G) periodically repeating according to a predefined period which is smaller than the duration of the guidance cycle: g1) reconstructing onboard the satellite a guidance instruction, g2) executing onboard the satellite the instruction by applying a closed control loop, H) measuring on the ground the real orbital trajectory of the satellite, I) repeating steps A) to H) with the trajectory measured at the end of the cycle as starting orbit of the following cycle, until the target orbit is attained.

7 Claims, 3 Drawing Sheets

(51) Int. Cl.
*B64G 1/00* (2006.01)
*B64G 1/40* (2006.01)

(58) Field of Classification Search
USPC .......... 701/3, 13, 14, 300, 36, 408; 340/438, 340/439, 988
See application file for complete search history.

(56) References Cited

U.S. PATENT DOCUMENTS

| | | | |
|---|---|---|---|
| 7,085,637 B2* | 8/2006 | Breed | B60N 2/2863 340/440 |
| 7,202,776 B2* | 4/2007 | Breed | B60N 2/2863 340/435 |
| 7,246,775 B1 | 7/2007 | Goodzeit et al. | |
| 2003/0191568 A1* | 10/2003 | Breed | B60W 40/06 701/36 |
| 2014/0166814 A1 | 6/2014 | Dargent | |

* cited by examiner

METHOD OF GUIDANCE FOR PLACING A SATELLITE ON STATION

CROSS-REFERENCE TO RELATED APPLICATION

This application claims priority to foreign French patent application No. FR 1402879, filed on Dec. 17, 2014, the disclosure of which is incorporated by reference in its entirety.

FIELD OF THE INVENTION

The present invention relates to the placement on station or the orbital transfer of satellites equipped with propulsive systems using low-thrust motors and which are placed on station or whose orbit is transferred through a significant number of orbital revolutions. These low-power motors are, for example, motors in which the ionization of the propellant gas is performed in an electrical manner at low thrust, typically using ion-grid, or else Hall-effect, nozzle technology. These motors are also known, in the prior art, as electric motors. Motors in which the ionization of the propellant gas is performed in a chemical manner are known, in the prior art, as chemical motors; they are generally intended to deliver high thrust but can also be used to deliver low or medium thrust.

BACKGROUND

These low-thrust motors make it possible to limit the mass of fuel necessary to perform the satellite orbit transfer operation. However, these motors being low power, they exhibit the drawback of lengthening the time required for placement on station or for orbital transfer by one to two orders of magnitude with respect to the use of high-thrust chemical motors. The nominal duration of the orbital transfer at low thrust may indeed vary from a few weeks to a few months.

On account of this low power and of the lengthening of the transfer time or the time required for placement on station, the control procedures which determine the motor thrust law (direction and amplitude as a function of time) and which are used for high-thrust chemical motors, are not applicable for low-thrust motors.

A control procedure for electric motors is described in the publication "Boeing Low-Thrust Geosynchronous Transfer Mission Experience", for orbital transfer from an elliptical injection orbit delivered by a launch vehicle, to a geostationary target orbit. It consists in the course of a first phase in applying a continuous thrust along the instantaneous velocity vector of the satellite until the latter attains an elliptical orbit of the same period as that of the target orbit. A second phase is devoted to the transformation of this elliptical orbit into a circular orbit by using a law of thrust orientation perpendicular to the apogee-perigee line in the plane of the orbit. This procedure exhibits a few drawbacks:

it is sub-optimal in so far as the transfer time is too long and the electrical fuel consumption (Xenon, Argon, etc.) too great;

it does not make it possible to attain the circular target orbit such as the operational orbit with sufficient precision;

it is limited to a transfer of GTO-GEO type, that is to say to a transfer from an elliptical orbit to a circular orbit of period 24 h. Furthermore it is also possible to envisage a transfer from a non-elliptical orbit to a non-circular orbit or more generally a transfer whatever the satellite starting orbit and arrival orbit.

These drawbacks are overcome by the method of placing on station described in patent application FR 2998875. It can be carried out onboard the satellite (in particular having requirements in terms of memory and calculation resources which are compatible with the performance of a satellite). This method makes it possible to determine the optimal control law whatever the starting and arrival orbit of the satellite, while minimizing journey time or fuel consumption when placing the satellite on station or during its orbital transfer. The resources, in terms of amount of memory available and of calculation power which are necessary for the operation of the method, are low with respect to the computing resources of current satellites. The control procedure is robust to mission interruptions, such as the interruption of steering for maintenance, faults, etc. The control procedure is capable of automatically correcting in closed-loop the optimal control law as a function of the deviation from the nominal trajectory, with simple calculations and without re-programming from the ground. Finally, this solution allows the achieving of autonomous orbital transfer and is suited to the use of electric motors.

But this method which is based notably on the knowledge onboard the satellite and in real time, of the position of the satellite, requires that the latter be equipped with a receiver of GNSS type. Such a receiver is difficult to design since the acquisition of the information is carried out on the sidelobes of the antenna of the receiver and therefore with a low SNR. And such a receiver is not suited to orbits or portions of orbit whose altitude is greater than that of the constellation of GNSS satellites which is about 20 000 km. Moreover, this method which is particularly well suited to the placement on station of a satellite in self-rotation about the thrust vector, poses an implementational problem when the satellite is not in this configuration.

SUMMARY OF THE INVENTION

The aim of the invention is to alleviate these drawbacks.
The guidance method according to the invention is based on a unique representation arising from optimal control theory (no change of paradigm). More precisely the subject of the invention is a method of guidance for the placement on station of a low-thrust satellite equipped with means of communication with a ground station, characterized in that it comprises the following steps carried out during a predefined current cycle:

A) determining on the ground for a predetermined cycle a law of orientation of the thrust vector of the satellite, and a history of state variables and of adjoint state variables of the satellite for the transfer from a starting orbit to a predetermined target orbit using optimal control theory, B) determining on the ground for the said cycle period, on the basis of the law of orientation of the thrust vector of the satellite and of the history of state variables and of adjoint state variables of the satellite, a law of evolution of the rotation of the satellite about the thrust vector in an inertial reference frame, C) representing according to a predetermined format the evolution of the state variables and adjoint state variables so as to obtain first parameters, D) representing according to a predetermined format a law of evolution of the rotation so as to obtain second parameters, E) concatenating the first and second parameters so as to obtain a guidance plan for the satellite, F) downloading onboard the satellite the guidance plan for the satellite, G) during the current cycle, repeating the following sub-steps according to a predefined period which is smaller than the duration of the guidance cycle:
   g1) reconstructing onboard the satellite a guidance instruction for the satellite,
   g2) executing onboard the satellite the guidance instruction by applying a closed control loop, H) measuring on the ground the real orbital trajectory of the satellite, I) repeating steps A) to H) periodically from cycle to cycle, with the trajectory measured at the end of the previous cycle as starting orbit of the following cycle, until the target orbit is attained.

This approach is generic in that it may be applied to any type of orbital transfer at low thrust.

The quality of the onboard guidance control obtained by the proposed approach turns out to be better than that obtained by the solution of the prior art (reduction of biases and of noise by construction):

The onboard open-loop guidance loop is reclosed by the ground over a periodic time horizon using standard ground means for the measurement and the filtering of the orbit.

The method according to the invention makes it possible to simply reconstruct onboard the guidance 3-axis satellite attitude (for example represented by a quaternion with unit norm), and not only the thrust vector orientation law.

Furthermore, this generalization of the satellite control is done without any additional approximation (no curve fitting: onboard, the attitude reconstruction process does not introduce any error).

The method according to the invention proposes an effective and robust procedure that can even cope with unprogrammed interruptions of the mission, so as to implement onboard a satellite the optimal control law which minimizes journey time or fuel consumption for a given nominal journey time. It is effective in the sense that a readjustment is made by the ground at the start of each cycle by considering the measured orbit, as well as a trajectory re-optimization at termination which gives rise to performance of the law implemented that is close to that of the theoretical law.

The cost of implementation in terms of memory and calculation is low in regard to the computing resources of contemporary satellites.

Furthermore, no navigation means (GNSS receiver and antenna) is required onboard, thereby decreasing the complexity and cost of development of the satellite.

BRIEF DESCRIPTION OF THE DRAWINGS

Other characteristics and advantages of the invention will become apparent on reading the detailed description which follows, given by way of nonlimiting example and with reference to the appended drawings in which.

Across the figures, the same elements are labelled by the same references.

DETAILED DESCRIPTION

The method according to the invention presupposes that the guidance trajectory is planned on the ground before the start of the low-thrust transfer. The first guidance plan is then downloaded onboard the satellite for application over a limited guidance horizon (for example 7 days). During the current cycle of the orbital transfer, the method makes it possible to simply calculate the guidance instruction onboard and to execute it in open-loop. The readjustment of the orbit is done on the ground. Next, a new ground planning of the guidance trajectory is carried out on the basis of the orbit measured until the target orbit. The new guidance plan is then downloaded to the satellite. The process stops after execution of the last guidance cycle.

Figure 1:
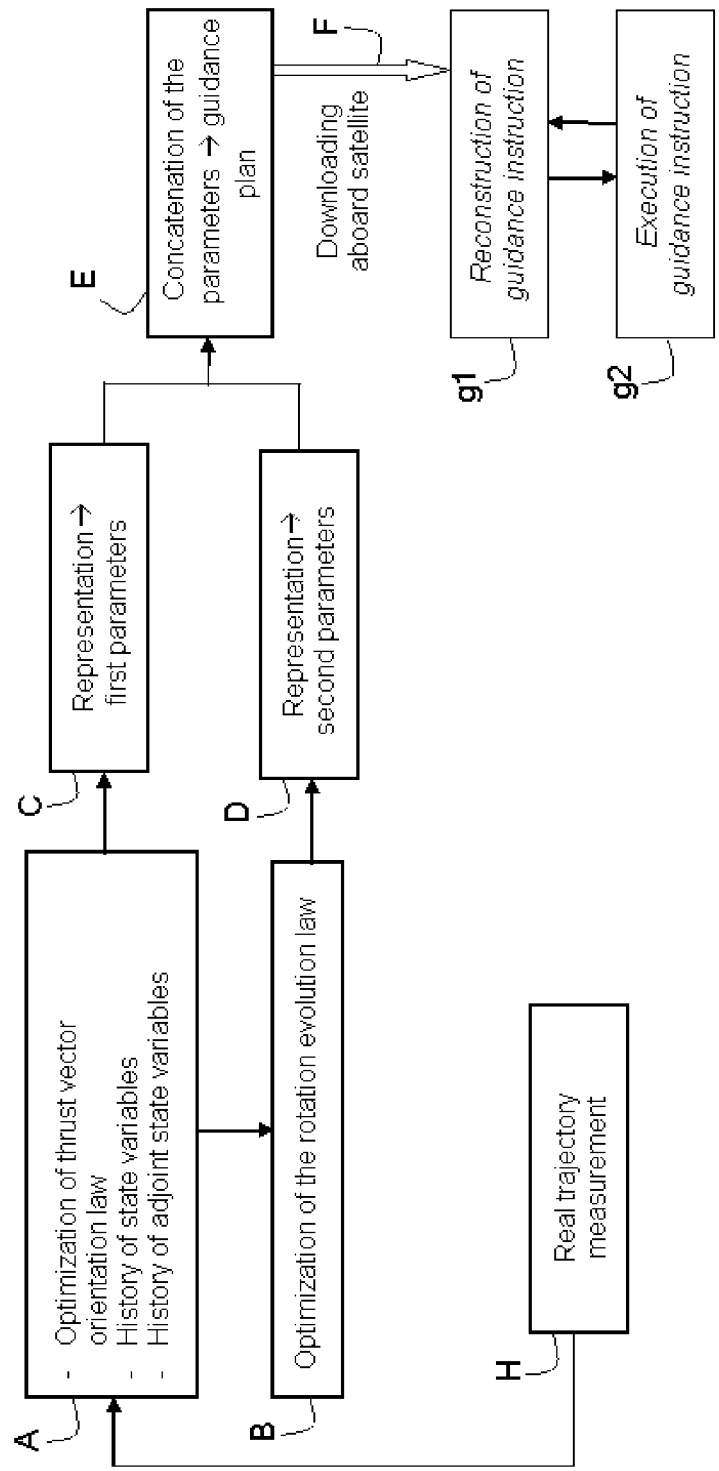
FIG. 1 schematically represents a flowchart of the various steps of the guidance method according to the invention.

The guidance method according to the invention is thus based on an iterative onboard-ground guidance loop (for a current cycle) which is summarized by the graph of FIG. 1 in which the steps carried out on the ground are indicated by straight characters, those carried out onboard being indicated by italics.

It comprises the following steps:

A) Determining on the ground for a predetermined guidance cycle, a law of orientation of the thrust vector of the satellite, and a history (that is to say the temporal evolution) of the state variables and adjoint state variables of the satellite, for the transfer from a starting orbit to a predetermined target orbit using optimal control theory.

It is recalled that a state vector makes it possible to characterize a dynamic system in vectorial form using state variables. The state variables at a given instant are quantities which completely define the state of the dynamic system at this instant. These quantities usually have a physical meaning. Knowing the state vector at an arbitrary instant t makes it possible to know the state over an interval [t, t+T], by integration with respect to time between t and t+T of the dynamics of the state vector. T is an arbitrary variable representing the prediction time horizon. The number, denoted by the letter n, of state variables is the dimension of the system.

B) Determining on the ground for the current guidance cycle, on the basis of the law of orientation of the thrust vector of the satellite and of the histories of state variables and of adjoint state variables of the satellite, represented in an inertial reference frame, a law of evolution of the rotation of the satellite about the thrust vector.

C) Representing on the ground according to a predetermined format the temporal evolution of the state variables and adjoint state variables so as to obtain first parameters.

D) Representing on the ground according to a predetermined format the law of evolution of the rotation so as to obtain second parameters.

E) Concatenating on the ground the first and second parameters so as to obtain a guidance plan for the satellite.

F) Downloading onboard the satellite this guidance plan.

G) During the current cycle, repeating the following steps according to a predefined period which is much smaller than the duration of the guidance cycle, for example every minute for a guidance cycle of a week:
   g1) reconstructing onboard the satellite a guidance instruction for the satellite,
   g2) executing onboard the satellite the guidance instruction by applying a closed control loop in a conventional manner.

H) During the current guidance cycle, measuring on the ground the real orbital trajectory of the satellite according to a predefined period, for example every 4 hours, so as to obtain a real orbital trajectory at the end of the cycle.

I) Repeating the previous steps over the following cycle, with the real trajectory measured at the end of the current guidance cycle as starting orbit, until the target orbit is attained.

These steps will now be detailed.

Beforehand, a starting orbit and a target orbit are defined. The starting orbit is for example the injection orbit delivered by the launch vehicle, or else an intermediate transfer orbit if the first part of the transfer is carried out conventionally by a high-thrust chemical motor; the target orbit is for example the operational orbit of the satellite mission (for example the geostationary orbit), or else an orbit close to the latter.

Likewise the guidance cycle also referred to as the guidance horizon is determined beforehand, experimentally or by simulation on the ground while making a compromise between cycle time (preferably long) and fuel consumption (preferably low).

Step A) for determining:
the law of orientation of the thrust vector of the satellite,
a history of state variables of the satellite, and
a history of adjoint state variables of the satellite,
can use various models of the spatial evolution of the satellite, such as are described in patent application FR 2998875.

A first model uses a Cartesian representation. A Cartesian representation is a representation in terms of position and velocity. This first model uses the following equations:

$$\frac{d^2 \vec{r}}{dt^2} = -\mu \frac{\vec{r}}{r^3} + \frac{F}{m}\vec{\beta} + \frac{\vec{F}_{disturbing}}{m}$$

$$\frac{dm}{dt} = -\frac{F}{g_0 \times I_{sp}}$$

In these equations the various variables represent the following elements:

$\vec{r}$ radius vector of the satellite with respect to the Earth's centre in meters, $\vec{\beta}$ vector of direction cosines of the thrust, F thrust of the motor (F≥0) in Newtons, $I_{sp}$ specific impulse of the motor in seconds, m mass of the satellite in kilograms, μ gravitational constant 3.986005 E+14 m3/s2 for the Earth, $g_0$ normalized terrestrial acceleration 9.80665 m/s2, $\vec{F}_{disturbing}$ set of disturbing forces perturbing the trajectory of the satellite in Newtons.

The disturbing forces acting on the satellite intervene to second order in the modifications of the trajectory of the satellite. Initially, their actions are therefore neglected and treated as disturbances by the closed-loop control.

Denoting the velocity by $d\vec{r}/dt = \vec{v}$ the equations for the dynamics of the satellite can be written in the form of a system of $1^{st}$-order nonlinear differential equations:

$$\begin{cases} \frac{d\vec{r}}{dt} = \vec{v} \\ \frac{d\vec{v}}{dt} = -\mu \frac{\vec{r}}{r^3} + \frac{F}{m}\vec{\beta} + \frac{\vec{F}_{disturbing}}{m} \\ \frac{dm}{dt} = -\frac{F}{g_0 \times I_{sp}} \end{cases}$$

The state vector of the system which makes it possible to have a Cartesian representation of the dynamics of the satellite is denoted by $$\begin{bmatrix} \vec{r} \\ \vec{v} \\ m \end{bmatrix}.$$

A second model uses a Keplerian representation. In this model, the equation for the dynamics of the satellite is transformed so as to express the motion of the satellite in terms of elements of Keplerian type. These Keplerian elements are the semi-major axis a, eccentricity e, the longitude of the perigee ω, the longitude of the ascending node Ω and the true anomaly v. This modelling offers the advantage of being directly interpretable by a person skilled in the art. Indeed, it directly expresses the geometric elements of the orbit of the satellite. Moreover, five of the six parameters are first integrals of the motion, thus allowing a simple numerical implementation. The state vector in this coordinate set is x=[a, e, i, ω, Ω, v, m].

A third model is the equinox model. This model uses coordinates whose parameters are p, $e_x$, $e_y$, $h_x$, $h_y$ and l:
p is the parameter of the conic, [$e_x$, $e_y$] represents the eccentricity vector and [$h_x$, $h_y$] the inclination vector. The state vector in this coordinate set is x=[p, $e_x$, $e_y$, $h_x$, $h_y$, l, m].

In contradistinction to the Keplerian model, the state dynamics of the equinox model do not exhibit any singularity, either for equatorial orbits (i=0°) or for polar orbits (i=90°). Moreover, the state dynamics are valid simultaneously for elliptical and hyperbolic orbits.

The parameters of the equinox model are expressed on the basis of the Keplerian parameters by the following equations:

$$p = a|1 - e^2| \text{ in metres}$$

$$e_x = e \times \cos(\omega + \Omega)$$

$$e_y = e \times \sin(\omega + \Omega)$$

$$h_x = \tan\frac{i}{2}\cos(\Omega)$$

$$h_y = \tan\frac{i}{2}\sin(\Omega)$$

$$l = \omega + \Omega + v \text{ in radians}$$

In these equations, the various elements represent:
a the semi-major axis in meters
e the eccentricity
i the inclination in radians
Ω the longitude of the ascending node in radians
ω the argument of the perigee in radians
v the true anomaly in radians Using the equinox model the equations for the dynamics of the satellite are the following equations:

$$\frac{dp}{dt} = 2\sqrt{\frac{p^3}{\mu}}\frac{1}{Z}S$$

$$\frac{de_x}{dt} = \sqrt{\frac{p}{\mu}}\frac{1}{Z}(Z\times\sin(l)\times Q + A\times S - e_y\times F\times W)$$

$$\frac{de_y}{dt} = \sqrt{\frac{p}{\mu}}\frac{1}{Z}(-Z\times\cos(l)\times Q + B\times S + e_x\times F\times W)$$

$$\frac{dh_x}{dt} = \frac{1}{2}\sqrt{\frac{p}{\mu}}\frac{X}{Z}\cos(l)\times W$$

$$\frac{dh_y}{dt} = \frac{1}{2}\sqrt{\frac{p}{\mu}}\frac{X}{Z}\sin(l)\times W$$

$$\frac{dl}{dt} = \sqrt{\frac{\mu}{p^3}}Z^2 + \sqrt{\frac{p}{\mu}}\frac{1}{Z}\times F\times W$$

$$\frac{dm}{dt} = -\frac{T}{g_0\times I_{sp}}$$

In these equations, the various parameters without units are defined by:

$$Z = 1 + e_x\cos(l) + e_y\sin(l)$$

$$A = e_x + (1+Z)\cos(l)$$

$$B = e_y + (1+Z)\sin(l)$$

$$F = h_x\sin(l) - h_y\cos(l)$$

$$X = 1 + h_x^2 + h_y^2$$

and Q, S and W are the radial, tangential and normal components of the acceleration delivered by the motor and/or the disturbing forces.

The dynamics of the satellite evolving slowly because of the low thrust of the motors, it is beneficial to look at the dynamics in terms of mean state parameters over an orbit instead of concerning oneself with the instantaneous state parameters as in the above equations.

The averaging operation is performed with the following formula:

$$\bar{x} = \bar{f} = \frac{1}{T}\int_0^T f(x, u^*)dt = \frac{1}{T}\int_0^{2\pi} f(x, u^*)\frac{1}{\left(\frac{dl}{dt}\right)}dl$$

$$T = \int_0^{2\pi} \frac{1}{\left(\frac{dl}{dt}\right)}dl$$

where f is the satellite dynamics dependent on the state x and on the control u* and T the period of the orbit. The averaging makes it possible to obtain a smoother representation of the parameters of the orbit which are more easily representable by polynomials.

A model of the dynamics of the satellite having been chosen, the reference trajectory is now determined as a function of the starting orbit, of the target orbit and of the characteristics of the satellite (total mass, total thrust and specific impulse of the electric propulsion motors used during transfer). This determination is carried out using optimal control theory by applying the maximum principle to the chosen model. This application of the maximum principle makes it possible to calculate the optimal reference trajectory over the current guidance cycle according to the optimality criterion employed: conventionally minimum time trajectory or trajectory with fixed duration and minimum fuel consumption. This step makes it possible to obtain an optimal trajectory dependent on a time t, whose representative parameters are $x_{ref}(t)$ and $\lambda_{ref}(t)$.

$x_{ref}(t)$ is the state vector of the satellite dynamics (for example $x_{ref}(t) = [p(t), e_x(t), e_y(t), h_x(t), h_y(t), l(t), m(t)]$) and, $\lambda_{ref}(t)$ are the Lagrange multipliers associated with the adjoint state vector of the satellite under application of the minimum principle, (for example $\lambda_{ref}(t) = [\lambda_p(t), \lambda_{e_x}(t), \lambda_{e_y}(t), \lambda_{h_x}(t), \lambda_{h_y}(t), \lambda_l(t), \lambda_m(t)]$).

The parameters of the satellite motor control law, associated with the optimal trajectory determined hereinabove, are then determined. This determination is performed by solving the equation in the control arising from optimal control theory on the basis of the state x(t) of the Lagrange multipliers λ(t). At any instant the control maximizes the Hamiltonian H of the problem. The parameters of the motor control law comprise:

the law of orientation of the thrust of the motor, the maximization of the Hamiltonian H with respect to the thrust orientation obtained by solving the following equation:

$$\frac{\partial H}{\partial u} = \left(\frac{\partial f}{\partial u}\right)^T \lambda + \left(\frac{\partial L}{\partial u}\right)^T = 0$$

The motor ignition parameter δ, obtained by solving the following equation:

$$\max_\delta(H(\delta=0), H(\delta=1))$$

δ represents the boolean determining whether the motor is ignited (δ=1) or extinguished (δ=0).

This step therefore makes it possible to obtain the law of orientation of the thrust vector of the motor, as well as the ignition law for this thrust.

It may be noted that the choice of the state variables and the use of filtering techniques or averaging has a direct impact on the ease of representation and of parametrization of these data onboard the satellite (see step C).

Indeed it is necessary to be able to download and store onboard the satellite the evolution of the satellite's state variables and adjoint state variables, discretized in time with the timestep of the computer over the duration of the guidance cycle (a week for example), this representing a download and memory storage that are very significant and expensive for a satellite. Conventionally these data arrays are replaced with a representation of associated parameters; it then suffices to download and store onboard the satellite these parameters alone (see step F).

B) The optimal law of evolution of the rotation (=evolution of the angle of steering) of the satellite about the thrust vector is now determined on the basis of this law of orientation of the thrust vector of the satellite and of the histories of the state vector and adjoint state vector of the satellite, represented in an inertial reference frame. Stated otherwise, this entails optimizing the nominal 3-axis satellite attitude and the law for steering the solar generators under operational constraints (kinematic, sensor, thermal, power)

over the current guidance cycle. The optimization uses a conventional constrained nonlinear optimization procedure, the objective function to be minimized being the mean solar aspect angle over the time horizon considered.

C) To reduce the volume of data to be downloaded and stored onboard the satellite, the data arrays arising from step A) are replaced with a representation of associated parameters.

Typically, the data of the state variables and those of the adjoint state variables are replaced with a time dependent polynomial representation of these variables; it then suffices to store only the coefficients of the polynomial (a few tens of values, depending on the order of the polynomial), also referred to as first parameters.

The averaged parameter $\lambda_{ex}$ possesses for example a polynomial representation of the form $$\lambda_{ex}(t)=1532774*t^6+18727.26*t^5-28021.34*t^4-3133.043*t^3+792.0076*t^2-189.1362*t+18.59838$$

with a correlation coefficient which is extremely close to 1: R2=0.9999190. This polynomial is therefore a very good approximation of $\lambda_{ex}$ over the whole of the duration of the journey. Seven coefficients suffice to represent it.

In the case of a conventional representation without prior averaging a single polynomial does not make it possible to represent p correctly over the whole of the trajectory since the solution of the problem is oscillating; in practice, it will be necessary to decompose the trajectory into small pieces and use a modelling based on a polynomial by oscillation.

Moreover, the search for the minimum distance of the current parameter p with respect to the nominal parameter p is complicated by the risk of encountering several local minima and therefore several solutions.

According to an alternative, this step C) can be carried out just after step A), before step B).

D) As previously, to reduce the volume of data to be downloaded and stored onboard the satellite, the data of the law of evolution of the rotation which arise from B) are replaced with:
    a representation in the form of a sampling table,
    a polynomial representation as indicated in the previous example, or
    a representation according to another format compatible with the desired performance.

The representation format chosen for the data of this law of evolution of the rotation is independent of the one chosen for the representation of the data of the state variables of the reference trajectory, and of the adjoint state variables. The data of this law of evolution of the rotation are for example replaced with the parameters obtained by the following representation: a representation in the form of a sampling table with a low temporal resolution, associated with a procedure for interpolating between the attitudes corresponding to two successive points in the table. For example, a timestep corresponding to about ten points per orbital revolution is sufficient, thus making it possible to limit the amount of data of type 2 in the guidance plan.

These parameters are referred to as second parameters.

It may be noted that selecting a representation of the 3-axis satellite attitude directly in the form of Euler angles or else in the form of unit quaternions (forms used conventionally by the onboard AOCS sub-system), exhibits the following drawbacks: the dynamics of the satellite attitude having higher frequency than the dynamics of the satellite state, the quality of the approximation or of the interpolation used onboard is mediocre and introduces errors and biases which are avoided by choosing the other representations advocated.

E) The first parameters and second parameters are then concatenated. These concatenated parameters define the guidance plan for the current cycle.

F) The latter is then downloaded from the ground station to the satellite and stored onboard the satellite. Conventional network means of ground stations equipped with antennas make it possible to establish the uplink (TC) and the downlink (TM) when the satellite is in visibility of one of the stations of the network used for the placement on station.

G) Thereafter, in a conventional manner, a sub-step g1) makes it possible to reconstruct the guidance instruction, onboard the satellite by using the parameters of the guidance plan which were downloaded; this step is therefore carried out in open-loop, without correction or compensation during the current cycle. This guidance instruction includes an instruction for orienting the thrust vector and a 3-axis attitude instruction for the satellite.

Next (sub-step g2) the guidance instruction is executed by an attitude control sub-system and an orbit control sub-system built into the satellite, including a mechanism for closed-loop steering around the guidance instruction.

These steps of reconstructing and executing the guidance instruction are carried out periodically for the duration of the cycle, according to a much smaller predefined period (for example every minute) than the duration of the cycle. This makes it possible to cause the displacement of the satellite during this cycle. This displacement of the satellite is in addition impacted by various external disturbances (for example solar radiation pressure, harmonic of the terrestrial potential, lunisolar attraction, etc.) or internal disturbances (for example the implementation errors in the motor thrust) which are treated by the closed-loop control of sub-step g2.

In parallel with the progress of these steps, that is to say during the current cycle, the real orbital trajectory of the satellite is measured on the ground regularly, according to a predefined period, for example every 4 hours. The estimated orbit is obtained by filtering of the measurements acquired on the ground (using a network of ground stations) with an orbit propagation model making it possible to integrate the low thrust as well as other models of natural disturbing forces (such as the effect of the flattening of the Earth) over a given orbital arc. The filter can be sequential (least squares) or else recursive (Kalman filter).

When this current cycle has terminated, the previous steps are repeated periodically from cycle to cycle, taking as starting orbit the real orbit measured on the ground at the end of the previous cycle, doing so until completion of the orbital transfer, that is to say until arrival at the orbital target with the precision desired for the placement-on-station mission.

The solution according to the invention makes it possible to split the overall problem of trajectory and attitude generation by splitting it into two simpler sub-problems (trajectory generation and attitude generation) treated sequentially, using an indirect approach for the trajectory generation and a nonlinear optimization approach for the attitude generation.

Solving the problem overall in a single step, for example by a constrained nonlinear optimization procedure, leads to a large number of decision variables, which gives rise to problems of convergence and of overly long response times.

Solving the problem by splitting it into two simpler sub-problems treated sequentially but using a non-indirect approach for the trajectory generation does not make it possible to benefit from the representation related to optimal control theory using the adjoint state of the satellite; the other approaches are specific and/or sub-optimal and/or introduce errors into the representation onboard.

Likewise, solving the problem by splitting it into two simpler sub-problems treated sequentially but using an approach other than nonlinear optimization for the attitude generation provides a feasible solution from the standpoint of the satisfaction of the attitude constraints, but a non-optimized solution.

The method according to the invention is distinguished from patent application FR 2998875 (or '875) in the following points.

Sharing of the Onboard-Ground Tasks:

The method of placing on station of '875 presupposes that a "Module for determining state (for example with a GPS)" is available onboard, which returns the state measured in real time onboard.

The method according to the invention makes it possible to dispense with such a module, and the measurement of the real state (acquisition and processing) is done on the ground on the basis of conventional measurements (distance, angular, Doppler) using a "Module for determining state on the ground". Consequently the method according to the invention does not require any onboard mechanism for readjusting the Lagrange multipliers, which serves for the onboard calculation of the control.

Guidance Horizon and Degree of Autonomy:

The method of placing on station of '875 presupposes that the guidance trajectory over the whole of the duration of the orbital transfer (typically 3 to 6 months) is planned on the ground before the start of the low-thrust transfer. During orbital transfer, this method then makes it possible to revert to the closed-loop reference trajectory. The method of placing on station of '875 applies to the whole of the orbital transfer without ground iteration, but this requires the development of an additional "module for determining state" on board.

The method according to the invention replaces the development of such a module with a low-frequency ground readjustment, and a re-optimization of the guidance trajectory by taking account of the effect of the aggregate errors accumulated over the orbit, due to non-modelled disturbances. An essential point is that the process of re-optimizing the guidance trajectory is identical to that of the initial optimization, using the same ground means and facilities (no additional development).

Figure 2A:
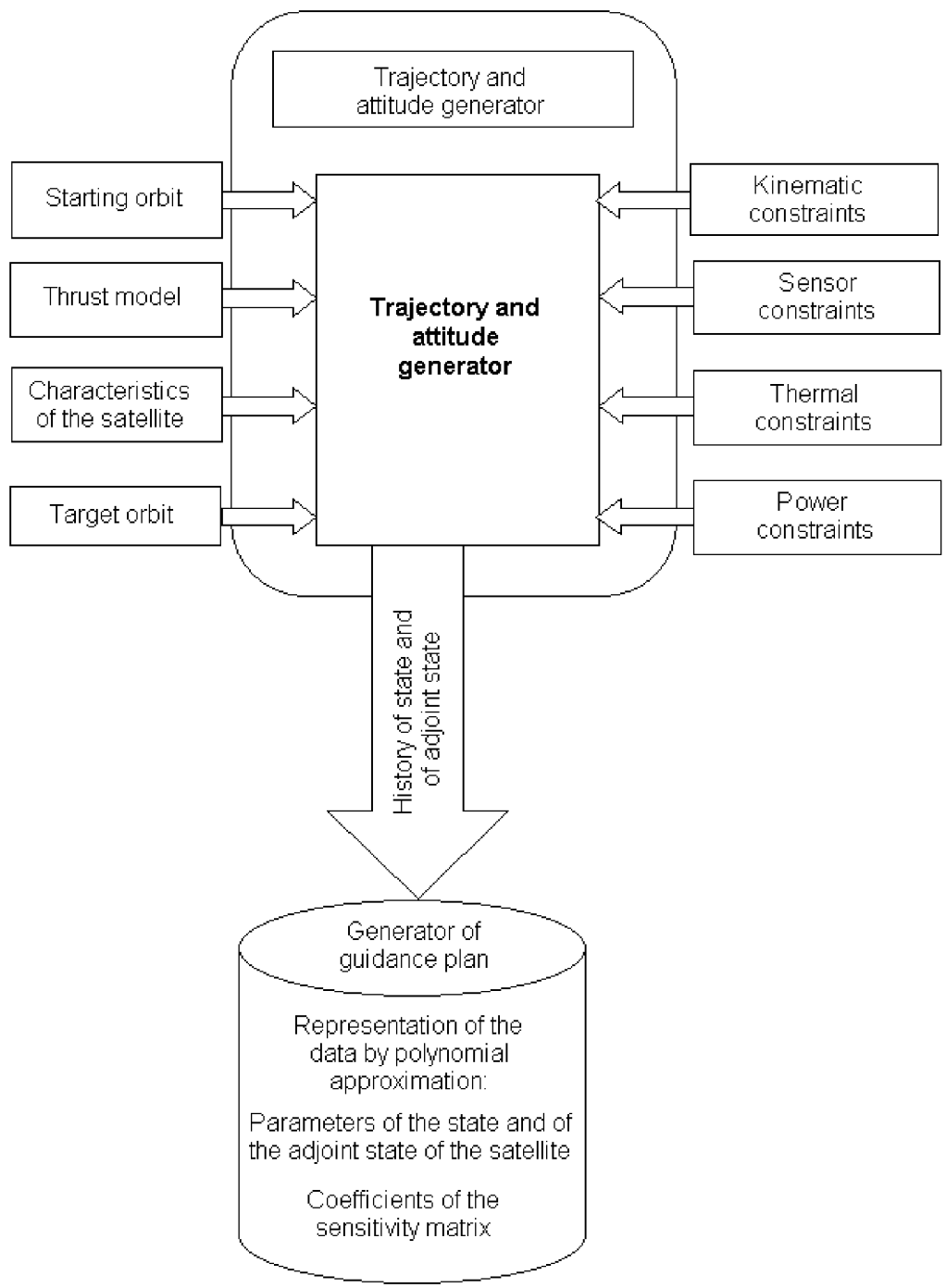
FIGS. 2a and 2b illustrate the differences when generating the guidance plan, between a method of the prior art (FIG. 2a) and that according to the invention (FIG. 2b).
Figure 2B:
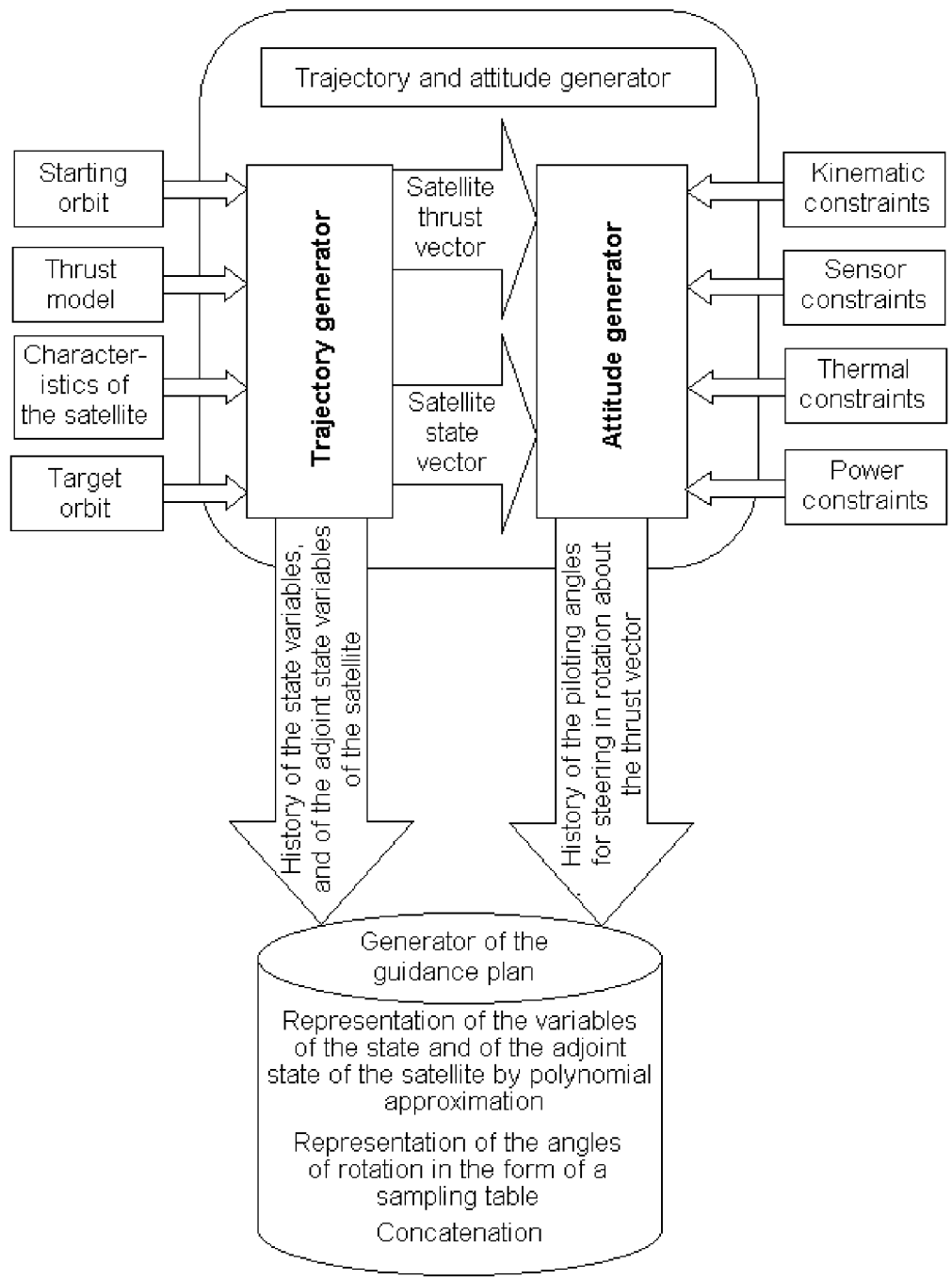

Content and Amount of Information in the Guidance Plan to be Downloaded to the Satellite:

As may be seen in FIG. 2, the method of placing on station of '875 requires the provision of the polynomial representation of the law of evolution of the Lagrange multipliers (adjoint state parameters) over a time horizon equal to the duration of the orbital transfer (typically 3 to 6 months). Furthermore, it is also necessary to give a sensitivity matrix: law of evolution of the coefficients of the matrix over a time horizon equal to the duration of the orbital transfer.

The method according to the invention requires the provision of the polynomial representation of the law of evolution of the Lagrange multipliers (adjoint state parameters) as well as that of the polynomial representation of the law of evolution of the state variables (for example, the equinoxial orbital elements), only over a time horizon equal to the duration of a guidance cycle (for example 7 days).

Reconstruction Onboard of Solely the Desired Orientation of the Thrust Vector/Reconstruction Onboard of the Complete 3-Axis Satellite Attitude:

As may be seen in FIG. 2, the method of placing on station of '875 makes it possible to reconstruct onboard the law of orientation of the thrust vector and optionally the law for "turning on" and "turning off" the low-thrust nozzles used for orbital transfer.

The method according to the invention also makes it possible to reconstruct the 3-axis satellite attitude (for example represented by a quaternion with unit norm). Accordingly, the following components must be added to the guidance system:

A "Module for state 3-axis attitude optimization under operational constraints", activated on the ground.

Additional data in the guidance plan to be downloaded onboard the satellite, making it possible to model and to represent the law as angular rotation about the thrust vector.

A generalization of the function of onboard recalculation of the satellite control on the basis of the data of the guidance plan so as to return the onboard instantaneous 3-axis satellite attitude instruction for execution by the attitude control system.

The guidance method according to the invention can be implemented on the basis of a satellite comprising at least one motor and an attitude control sub-system, and which comprises means for implementing the guidance method presented hereinabove in conjunction with means of one or more ground stations.

The guidance method can for example be implemented on a generic processor, a dedicated processor, an array of programmable gates also known as an FPGA (Field Programmable Gate Array).

This guidance method can also be implemented on the basis of a computer program product, this computer program comprising code instructions making it possible to perform the steps of the guidance method. It is recorded on a computer readable medium. The medium can be electronic, magnetic, optical, electromagnetic or be a dissemination medium of infrared type. Such media are for example semi-conductor memories (Random Access Memory RAM, Read-Only Memory ROM), tapes, magnetic or optical diskettes or discs (Compact Disk-Read Only Memory (CD-ROM), Compact Disk-Read/Write (CD-R/W) and DVD).

Although the invention has been described in conjunction with particular embodiments, it is quite obvious that it is in no way limited thereto and that it comprises all the technical equivalents of the means described as well as their combinations if the latter enter within the framework of the invention.

The invention claimed is:

1. A method of guidance for placing on station a satellite communicating with a ground station, comprising the following steps carried out during a predefined current cycle:
   A) determining on the ground for a predetermined cycle, a law of orientation of a thrust vector of the satellite, and a history of state variables and of adjoint state variables of the satellite for a transfer from a starting orbit to a predetermined target orbit using optimal control theory,
   B) determining on the ground for a cycle period, on the basis of the law of orientation of the thrust vector of the satellite and of the history of state variables and of adjoint state variables of the satellite, represented in an inertial reference frame, a law of evolution of a rotation of the satellite about the thrust vector,
   C) representing according to a predetermined format an evolution of the state variables and adjoint state variables so as to obtain first parameters, D) representing according to a predetermined format a law of evolution of the rotation so as to obtain second parameters,
E) concatenating the first and second parameters so as to obtain a guidance plan for the satellite,
F) downloading onboard the satellite the guidance plan for the satellite,
G) during the current cycle, periodically repeating the following sub-steps according to a predefined period which is smaller than a duration of the guidance cycle:
  g1) reconstructing onboard the satellite a guidance instruction for the satellite,
  g2) executing onboard the satellite the guidance instruction by applying a closed control loop,
H) measuring on the ground a real orbital trajectory of the satellite,
I) repeating steps A) to H) periodically from cycle to cycle, with the real orbital trajectory measured at an end of a previous cycle as starting orbit of a following cycle, until the target orbit is attained.

2. The method according to claim 1, wherein the target orbit is an operational orbit.

3. The method according to claim 1, wherein the starting orbit is an injection orbit.

4. The method according to claim 1, wherein the evolution of the state variables and adjoint state variables is represented using a polynomial representation.

5. The method according to claim 1, wherein the law of evolution of the rotation is represented in the form of a sampling table.

6. The method according to claim 5, wherein the current cycle is of a week.

7. A non-transitory computer readable storage medium comprising code instructions to perform the steps of the method according to claim 1, when the program is executed on a computer.

* * * * *